UNITED STATES PATENT OFFICE.

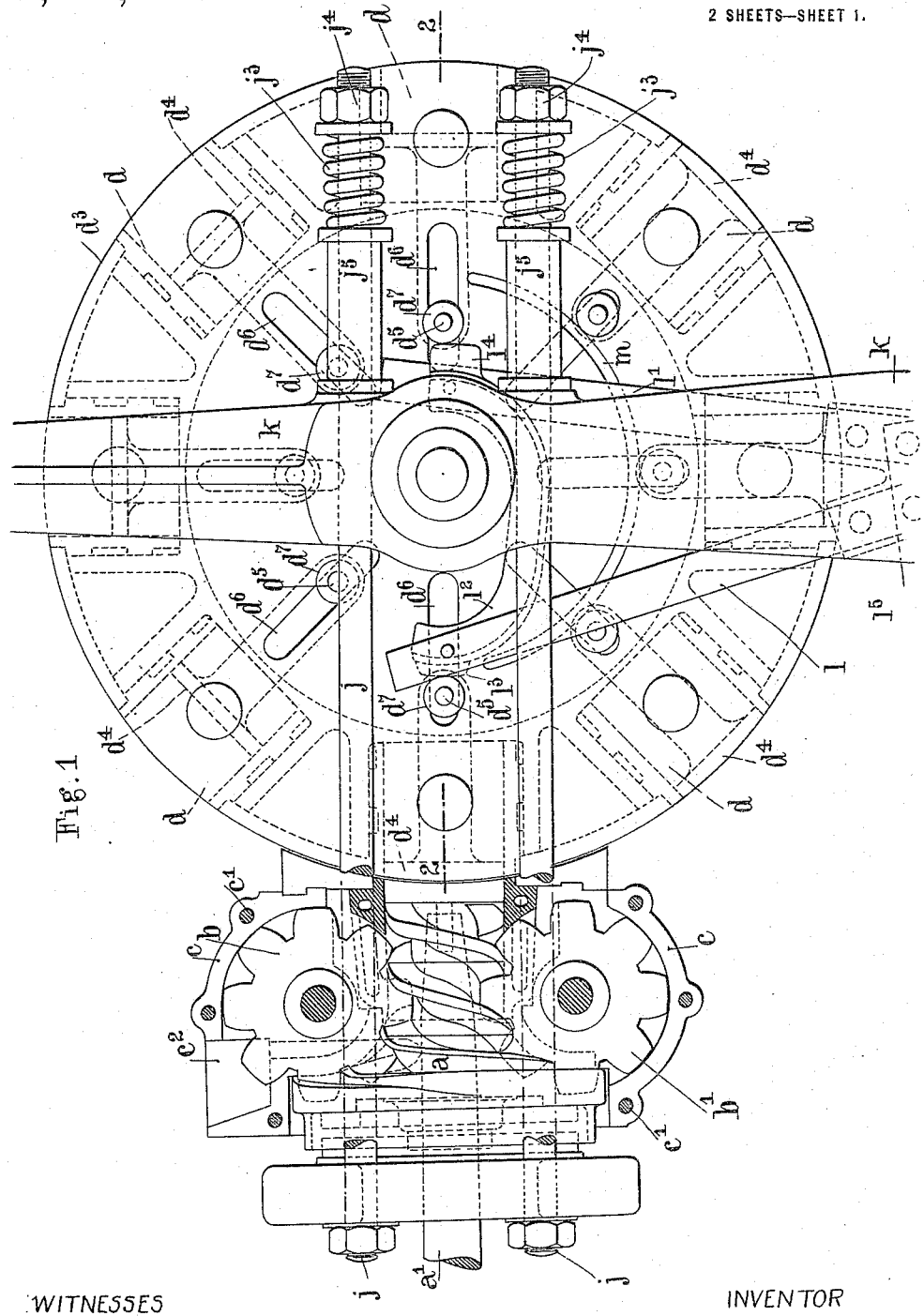

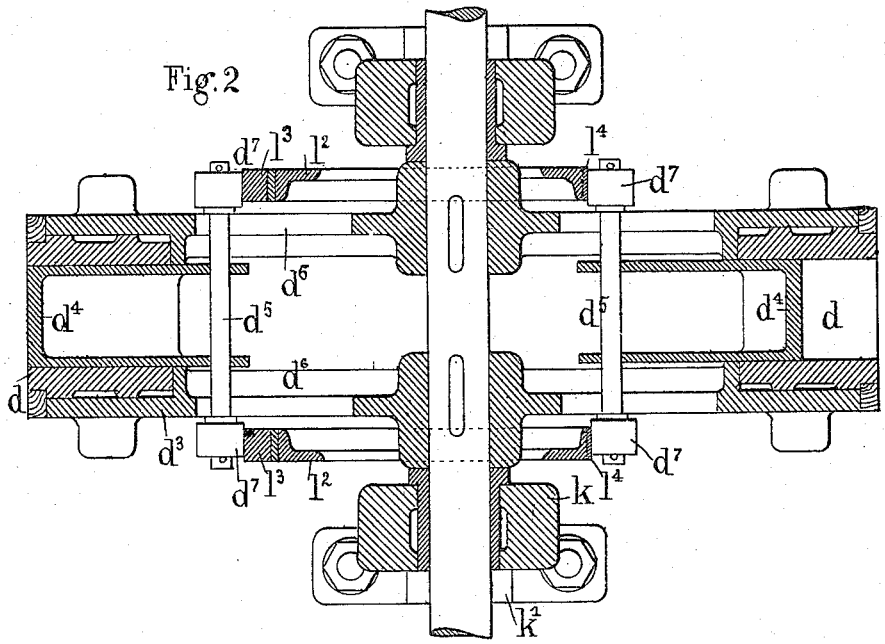
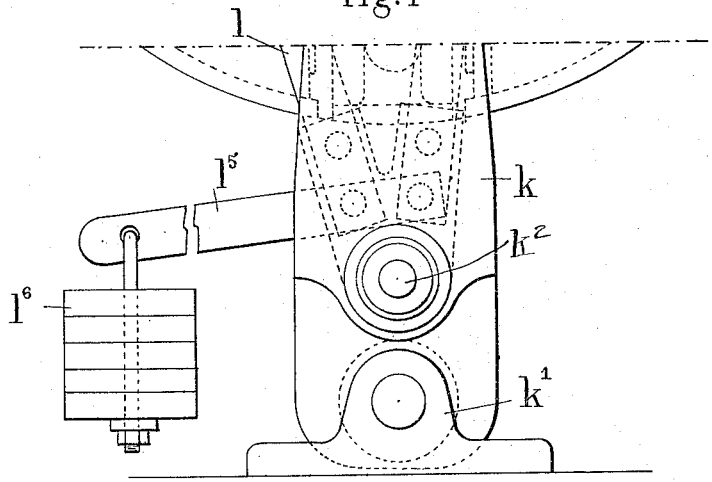

LADISLAS PENKALA, OF BOIS-COLOMBES, FRANCE.

MACHINE FOR MOLDING PLASTIC MATERIALS.

1,163,449.  Specification of Letters Patent.  Patented Dec. 7, 1915.

Original application filed May 12, 1911, Serial No. 626,743. Divided and this application filed June 13, 1912. Serial No. 703,418.

*To all whom it may concern:*

Be it known that I, LADISLAS PENKALA, a subject of the Emperor of Russia, and a resident of 16 Rue Pierre Joigneaux, at Bois-Colombes, Department of Seine, France, have invented a new and useful Machine for Molding Plastic Materials, of which the following is a specification.

This invention relates to a drum press for molding plastic materials, based on the known principle of the combination of a screw with two cam wheels engaged in its convolutions for conveying the material, successively compressing its particles, and carrying it to the mouth of the press to be molded almost in a dry state. Such an apparatus is described in the specification of my application for Letters Patent Serial #626,743, of which the present application is a division.

The purpose of the present invention is to maintain the drum against the mouth of the press by an arrangement of counterweights, springs or the like, which allows the mold to withdraw from the mouth of the press when the maximum pressure assigned to the material is accidentally exceeded, the material then escaping between the mold and the mouth of the press so as to be automatically returned to the press by any suitable device.

The accompanying drawings represent, as an example, a form of the invention applied to a press for molding briquets, the molds of which are arranged on the periphery of a drum having a horizontal axle.

Figure 1 is an elevation of the main portion of the apparatus. Fig. 1ª shows the lower part of the apparatus omitted from Fig. 1; and, Fig. 2 is a section of the drum taken along the line 2—2 of Fig. 1, parts being broken away.

The press consists of a screw $a$ combined with two cam wheels $b$ $b'$ inclosed in an outer casing $c$ formed of two parts connected together by bolts $c'$, and in the upper part of said casing are provided two apertures $c^2$ for the introduction of the material. The screw $a$ is set on an axle $a'$ driven in any appropriate way.
The molds $d$ are arranged in pairs diametrically opposite to each other on the periphery of a horizontal drum $d^3$. In each of the molds is engaged a piston $d^4$ provided with a transverse rod $d^5$, the ends of which project laterally at each side of the drum through slots $d^6$ and carry rollers $d^7$. The drum $d^3$ is journaled in a support $k$ articulated at its base on bearings $k'$ (Fig. 1ª). At the base of said support are journaled two double levers $l$ $l'$ the journal for said levers being indicated at $k^2$ (Fig. 1ª). On these levers are articulated, at each side of the drum, pieces $l^2$ terminated by the shoulders or flanges $l^3$, $l^4$ situated along the longitudinal axis of the press and at each side of the journals of the drum, in order to come between the rollers $d^7$ of the diametrically opposed pistons $d^4$.

The double levers $l$, $l'$ are subjected to the action of a spring or adjustable counterweight $l^6$ acting on the arms $l^5$ fixed on the levers (Fig. 1ª) in order to maintain the pieces $l^2$ with their flanges or shoulders $l^3$ resting against the rollers of the piston in front of the mouth of the press.

On each side and below the journals, of the drum, are fixed on the support $k$ circular tracks $m$ concentric with the path traveled by the rollers $d^7$, when the pistons are at the end of their stroke for the removal of the briquet, in order to maintain them in this position until the moment of a new molding.

At each side of the drum $d^3$ pass two rods $j$ forming part of the body of the press. On these rods are arranged buffer springs $j^3$ bearing on the ends of the rods $j$ and on the sleeves $j^5$ mounted to slide on the rods $j$. The support $k$ of the drum rests directly against the sleeves $j^5$. By this arrangement the drum $d^3$ is held against the mouth of the press by the springs $j^3$, but can yield longitudinally, or withdraw from the body of the press, when the pressure at the mouth of the press exceeds that determined by the pressure of the said springs.

The material coming out from the press enters the mold $d$ situated in front of the mouth of the press pushing back the piston $d^4$ which maintains the compression of the briquet as it is determined by the counterweight $l^6$.

The piston forced back by the advance of the material being molded, acts by means of its rollers $d^7$ on the pieces $l^2$ which in turn act upon the rollers of the opposite piston removing the briquet from the mold. It is to be understood that the resistance occasioned by the removal of the briquet from the mold must be taken into consideration, as this resistance will be added to that of the counterweight $l^6$ for determining the degree of compression of the briquet.

If the total resistance offered to the introduction of the material exceeds the limit assigned by the power of the springs $j^3$, the whole drum withdraws from the press, oscillating around the axle $k'$, thus avoiding all risk of breaking the press.

The drum may be rotated by any suitable mechanism in order to bring the molds successively into position, and the molds may be of any desired kind.

The arrangement according to the invention may be applied to any type of drum press. Instead of the oscillating motion of the drum, the latter may be mounted on slides and have a recoil motion.

Having now particularly described and ascertained the nature of my said invention and in what manner the same is to be performed, I declare that what I claim is:—

1. A drum press for molding plastic material, comprising a screw press, a rotative drum placed in front of the mouth of the press, means for allowing the drum to withdraw from the mouth of the press under the influence of an excessive pressure of the material, molds disposed on the periphery of said drum, pistons movable in said molds, means for causing the piston of the mold placed in front of the mouth of the press to offer a resistance to the progress of its material, and means for insuring the removal of the material contained in the mold diametrically opposed.

2. A drum press for the molding of plastic materials, comprising a screw press, a rotative drum placed in front of the mouth of the press, molds disposed on the periphery of the said drum, pistons movable in the said molds and provided with rods, a support for the drum, two levers journaled on the support, a piece connecting the said levers, one end of which rests on the rod of the piston of the mold placed in front of the mouth of the press and the other extremity of which rests on the rod of the piston diametrically opposed, arms connected with the levers, and a counterweight mounted at the end of the arms.

3. A drum press for molding plastic materials, comprising a screw press, a rotative drum placed in front of the mouth of the press, molds disposed on the periphery of said drum and arranged in pairs diametrically opposite each other, pistons movable in the said molds and provided with transverse rods projecting at their ends through slots in the sides of the drum, rollers on the ends of said rods, supports for the drum, levers journaled on said supports, members connected with said levers, the said members at one end engaging the rollers on the rod of the piston of the mold placed in front of the mouth of the press, the other ends of said members engaging the rollers on the rod of the piston diametrically opposite, and means connected with said levers for yieldingly holding the said members against the rollers of the piston in front of the mouth of the press.

In testimony whereof I have signed my name to this specification, in the presence of two subscribing witnesses.

LADISLAS PENKALA.

Witnesses:
 FERNAND GERVAULE,
 JACQUES LIGERNEY.

Copies of this patent may be obtained for five cents each, by addressing the "Commissioner of Patents, Washington, D. C."